April 22, 1952 W. R. KOHL 2,593,895
SHIPPING CONTAINER
Filed Aug. 17, 1948 4 Sheets-Sheet 1
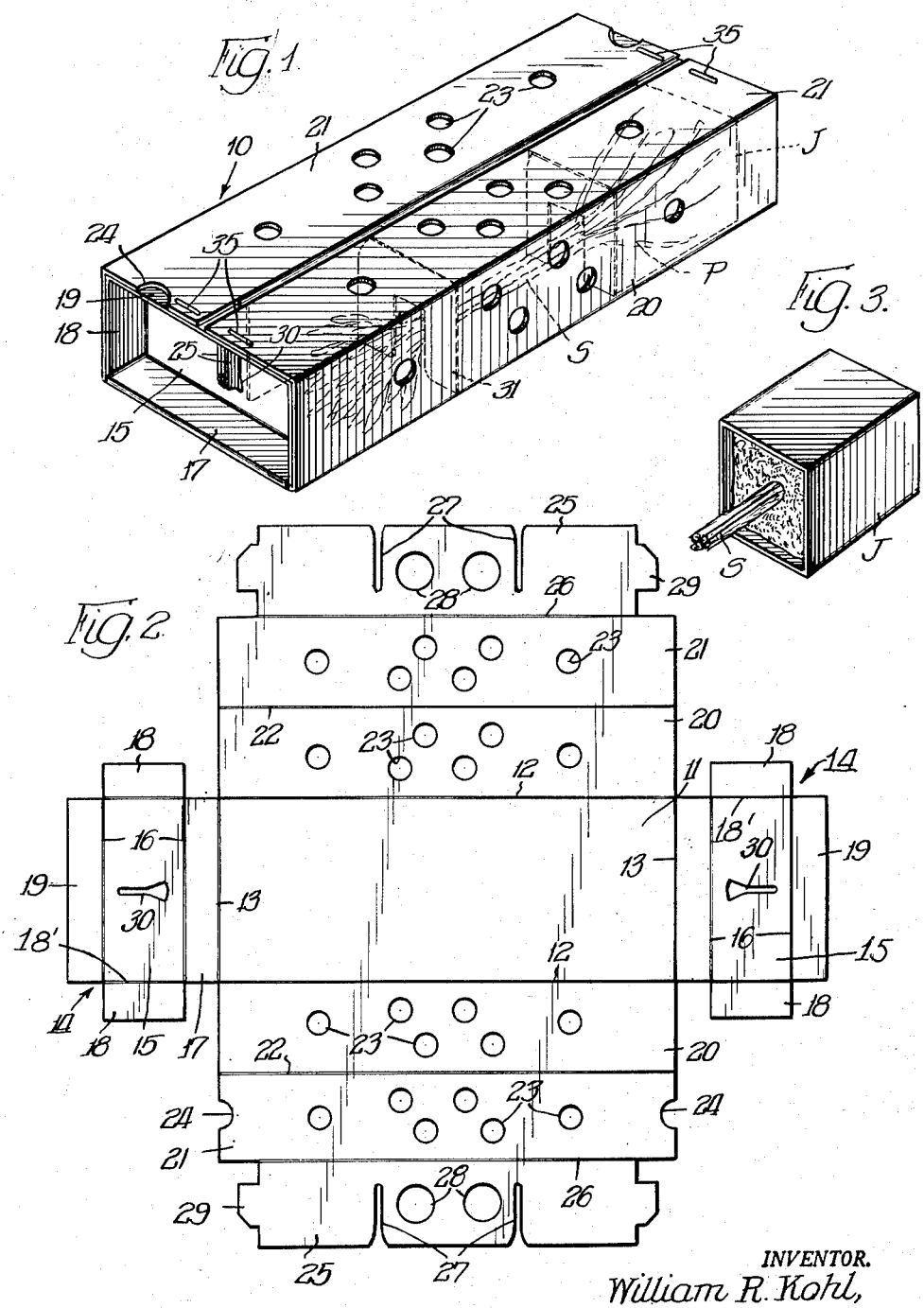
INVENTOR.
William R. Kohl,
BY
Cromwell, Greist & Warden
Attys.

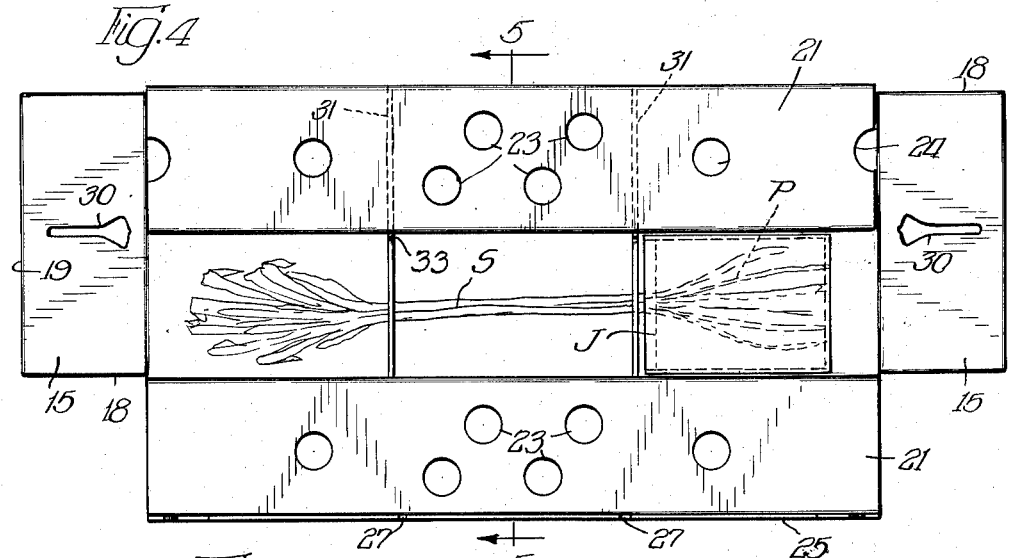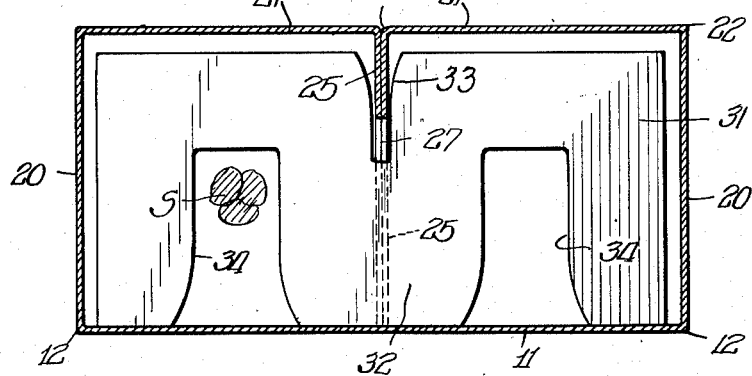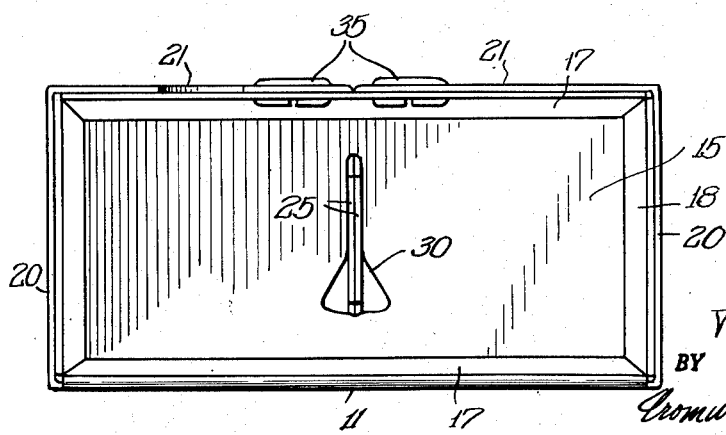

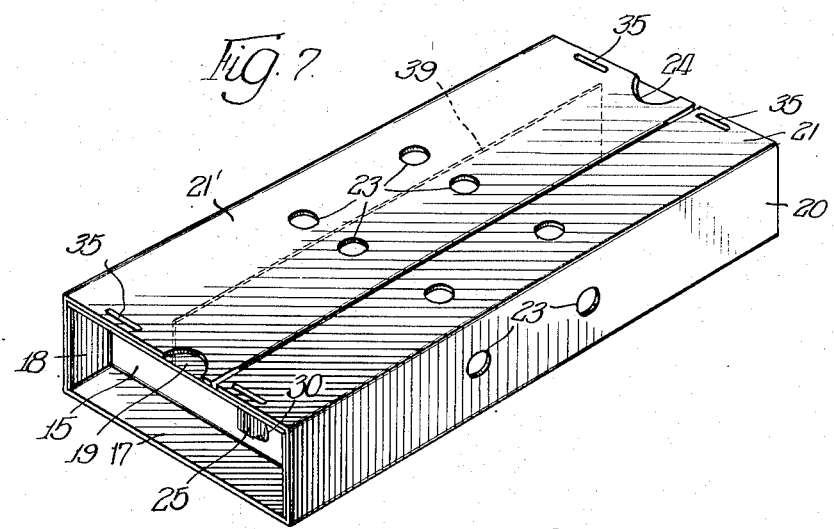
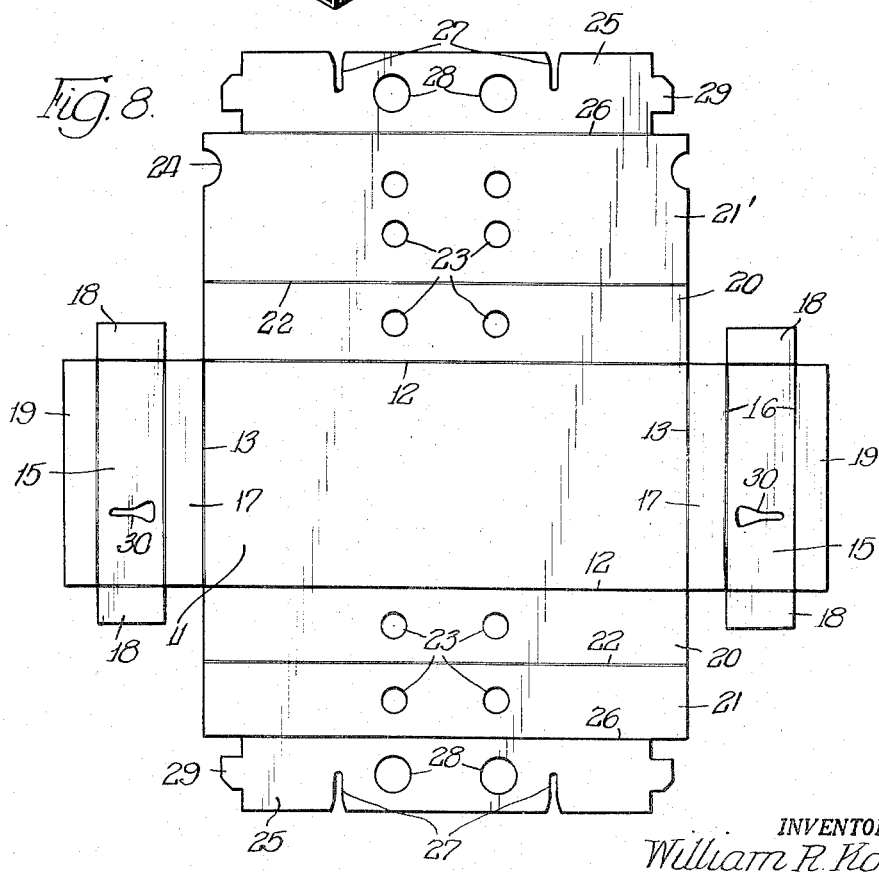

April 22, 1952        W. R. KOHL        2,593,895
SHIPPING CONTAINER
Filed Aug. 17, 1948        4 Sheets-Sheet 4
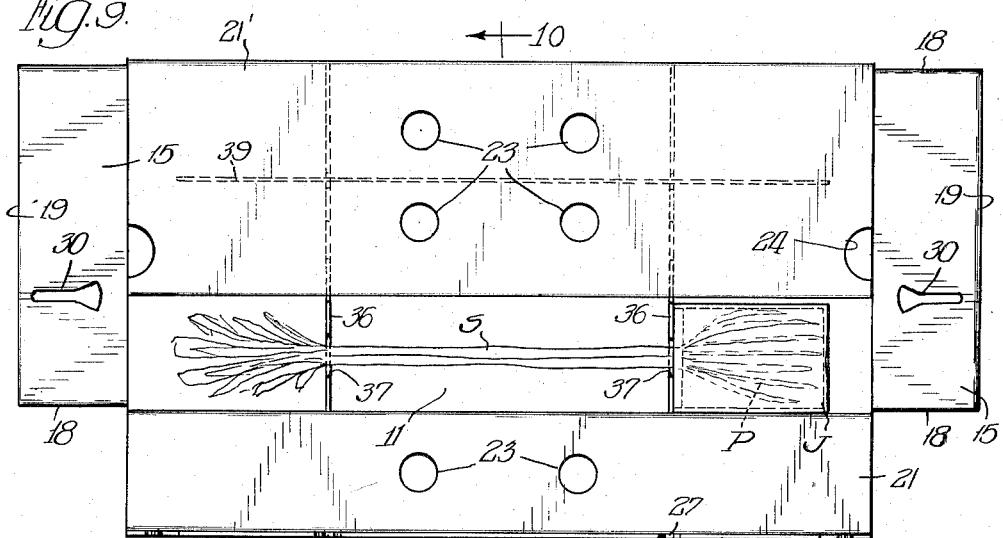
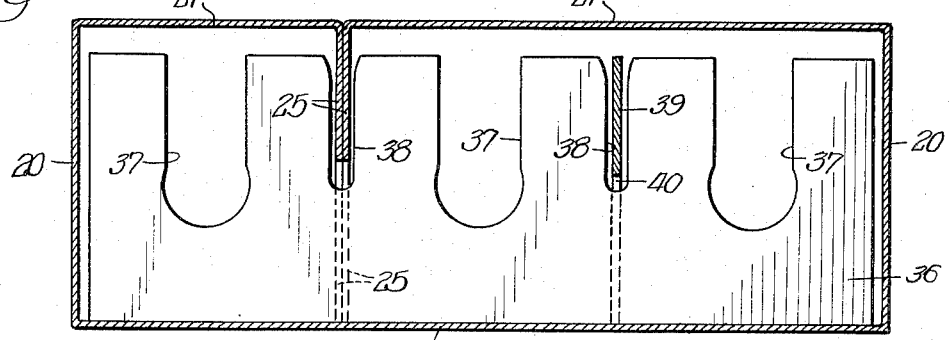
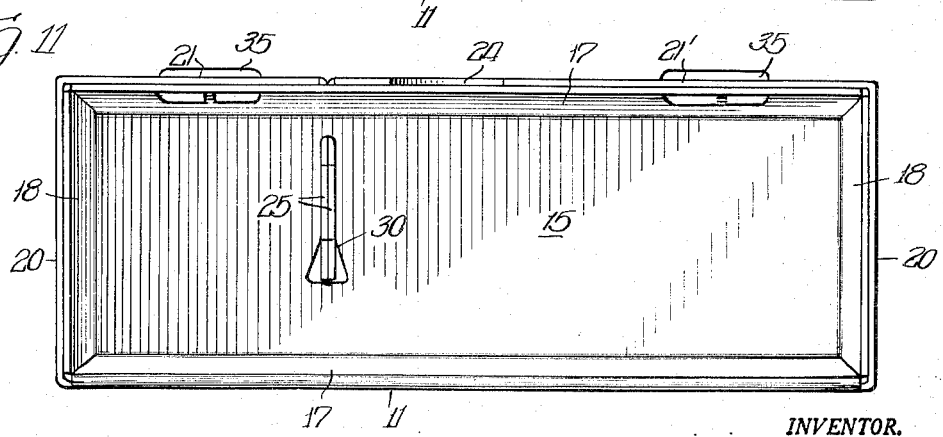
INVENTOR.
William R. Kohl,
BY
Cromwell, Greist & Warden
ATTYS.

UNITED STATES PATENT OFFICE 2,593,895

SHIPPING CONTAINER

William R. Kohl, Glenview, Ill.

Application August 17, 1948, Serial No. 44,712

2 Claims. (Cl. 229—27)

This invention pertains to an improved, semi-rigid shipping container which is particularly well adapted for the shipping of potted plants, plants in soil containing forms or jackets, growing bulbs and related or similar shaped objects. In particular, a plant having its roots embedded in a substantial amount of soil, obviously requires considerable confinement and bracing in shipment in order to prevent the soil from becoming dislodged from the roots and allowed to escape into the portion of the container in which the stem or longitudinally projecting portion of the plant or other article is received. It is also highly desirable that this last named portion be braced and restrained from undue lateral jostling under the normal shocks and impacts of mailing, such as might result in damage to buds or blossoms thereon. Ordinary types of containers, whether rigid, semi-rigid or flexible, are not well adapted to these purposes.

It is therefore a general object of the invention to provide a container fabricated of a relatively stiff grade of cardboard or paper board stock or equivalent material, said container being died out in the form of a one-piece blank and creased, scored or otherwise shaped to enable ready and quick manipulation thereof to a final article enclosing condition, which container is employed in conjunction with novel provisions for bracing and supporting an article such as a plant for shipment by parcel post or the like.

Another object is to provide a receptacle or container of the foregoing type which is compartmented to receive and house a plurality of plants or like objects in a manner to separate and restrain the same individually and to prevent damaging impacts thereto due to jostling in shipment or handling.

A still further object is to provide a shipping container of semi-rigid character adapted to be quickly erected to operative condition which is strongly braced and rigidified when in that condition to withstand shipping shocks, and which does not require the use of any further enclosing or wrapping means to adapt the same for shipping through any of the usual agencies.

Yet a further and more specific object is to provide a foldable, compartmented container or receptacle of the above type including individual partition or divider elements adapted to assist in laterally and longitudinally restraining an article or articles therein, said receptacle and dividers being positively engaged frictionally with one another to prevent displacement of the latter.

A still further specific object is to provide a compartmented shipping receptacle of the above type including foldable bottom, side and top wall members adapted to be disposed in predetermined fixed relation to one another to compartmentize the receptacle, together with a novel flanged end structure adapted to be disposed in internally telescoped and secured relation to said wall members in a manner to strongly brace the same against inadvertent withdrawal or displacement, as well as to greatly rigidify the receptacle as a whole.

Generally, it is an object to provide a container or receptacle having the foregoing features which is sufficiently sturdy for shipment in unwrapped condition, requiring only the affixation of proper addresses and postage directly thereto; which is provided with a multiplicity of ventilating openings for a plant or like growing object encased therein; which is very compact in size and economical as regards the material and manufacturing operations involved in fabricating the same; and which is well adapted to receive a conventional type of securing means to hold its parts in operative relation.

The foregoing statements are indicative in a general way of the nature of the invention, but other and more specific objects will be apparent to those skilled in the art upon a full understanding of the construction and operation of the device.

Two embodiments of the invention are presented herein for purpose of exemplification, but it will be appreciated that the invention is susceptible of incorporation in other modified forms coming equally within the scope of the appended claims.

In the drawings:

Fig. 1 is a perspective view of the shipping receptacle or container of the invention, showing the same in final erected condition and illustrating, in dotted lines, a potted plant encased in a soil containing form which is received in the container, as well as certain internal divider elements which serve to laterally and longitudinally brace and restrain the plant and form;

Fig. 2 is a plan view of the blank required for the container of Fig. 1, illustrating the manner of aperturing and creasing the blank to permit folding manipulation thereof;

Fig. 3 is a fragmentary perspective view more clearly illustrating the plant to be shipped in its relation to a common type of soil confining form or jacket, such as is employed in putting up the plants for sale;

Fig. 4 is a top plan view illustrating the container in partially completed or erected form, with one of the two cover members thereof in open condition and one in closed position, this view also indicating the manner in which a potted plant is disposed in one of the two compartments of the receptacle and restrained by the divider elements above referred to in connection with Fig. 1;

Fig. 5 is an enlarged view of the container in transverse vertical section on a line generally corresponding to line 5—5 of Fig. 4, showing the package following final closure of the cover members;

Fig. 6 is an enlarged view in end elevation of the closed and sealed container; and Figs. 7 through 11 are views which are generally similar to Figs. 1, 2, 4, 5 and 6 respectively, illustrating a container in accordance with the somewhat modified embodiment of the invention, which is of augmented capacity but which embodies the basic principles involved in the first embodiment, Fig. 10 being in section along line 10—10 of Fig. 9.

For the sake of simplicity, the structural features of said container, in both embodiments thereof, are described in relation to an adaptation for the shipment of growing plants, in which the bulb or root is embedded in soil; however, it will be apparent to those skilled in the art that the containers are equally well suited for the cartoning and shipment of other, generally similarly shaped types of articles, which present equivalent requirements in the handling and protection thereof during shipment, handling or storage.

Referring to Fig. 1 of the drawings, the reference numeral 10 generally designates the improved shipping receptacle or container in accordance with the invention, a plant or like article P being illustrated in dotted lines as housed within one compartment of the receptacle. The plants are customarily put up with a quantity of soil or fertilized material in conventional, cheap wood veneer plant forms or jackets such as is illustrated in Fig. 3. This jacket may be further encased for the purpose of shipping in a protective wrapper of waxed paper or the like, but it has been deemed desirable to omit illustration of the latter in order to preserve clarity of the drawings as much as possible.

The container 10 is shown in its final form ready for shipment, it being only necessary to apply thereto the address of the consignee and the proper postage, as on the bottom panel thereof. The container is fabricated from a blank of the type illustrated in Fig. 2, which is in the form of a sheet of considerably stiff and strong paper board, cardboard of like inexpensive material, subdivided by the crease or score lines to be described into a plurality of panels or sections.

These sections include a bottom 11 outlined by the pairs of longitudinal and transverse creases 12, 13. Creases 13 serve to flexibly conjoin to the bottom a pair of opposed identical end sections 14, each of which includes the end wall 15 flexibly conjoined by one of a pair of creases 16 to a hinging flange 17. Said flange is in turn hinged to the bottom panel 11 by the aforementioned crease line 13. End walls 15 also are provided with lateral flange-like tabs 18, bendably connected to the walls by creases 18, and a free end tab 19 conjoined thereto by a crease 16. The purpose of this flanged end construction will later appear.

A pair of side walls 20 are flexibly conjoined to the bottom 11 by the creased hinging lines 12 and in turn have the similar top or cover members 21 flexibly conjoined thereto by parallel creased lines 22. Said side walls and top members are provided with a plurality of ventilating apertures 23 for an obvious purpose and one thereof is provided with a pair of notched thumb recesses 24 at opposite end margins thereof.

Terminal bracing and compartmentizing flaps 25 are disposed along opposite side margins of the blank, being flexibly connected to the top members 21 by the creased hinge lines 26, and it will be noted that each of these flaps is subdivided into three parts by the inwardly directed, equally spaced, transverse slots 27. Said slots extend from the terminal margins of flaps 25 partially inwardly of their transverse dimensions. Cross ventilating apertures 28 may be formed in the center subdivision of the flaps 25 and the other two subdivisions of each flap carry longitudinally protruding locking ears 29. In order to lockingly engage with these ears in a manner which is hereinafter described in detail, the end walls 15 of each of the end sections 14 are provided with shaped, keyhole type openings 30 located centrally of the walls and intermediate the respective crease lines 16.

Reference is next directed to Fig. 5, wherein is best illustrated the structural details of one of the divider elements 31 which are employed in conjunction with the foregoing structure, for the purpose of longitudinally and laterally confining the plants P housed in the receptacle. This element is stamped from cardboard or like stock of about the same grade as the blank shown in Fig. 2, in an approximately M-shaped outline, as viewed in Fig. 5. This provides a central depending portion or foot 32 having a vertical cleft 33 therein, wherein the terminal flaps 25 of the container are received in operative erected condition, and a pair of enlarged recesses 34 which accommodate the stem S of the plant, or the elongated portion of any other article involved.

In employing the container, the blank shown in Fig. 2 is initially folded along crease lines 12 to bring the side members 20 into upstanding relation to the bottom 11. The plant is then placed in position on said bottom, approximately as illustrated in Fig. 4. In this connection it may be noted that the width of the bottom 11 is approximately twice the width of the plant form or jacket J and that the side member 20 and top member 21 are each about equal to its width. Likewise, the jacket J is positioned with its inner end adjacent the slots 27 of the opposed flaps 25 so that when a divider is positioned across said end it will be in transverse register with said slots. The space left between the opposite end of the jacket and the end margin of bottom 11 approximates the width of the end wall hinging flange 17.

A second plant may be disposed in side-by-side relation to the first, and with its stem extending in the same direction, or, if it is desired to better equalize the weight distribution of the resultant container, the jacket J of the second plant may be reversed. With the plants so positioned, the dividers 31 are slipped in place, one immediately adjacent the inner end of each jacket J, and in transverse alignment with the respective slots 27 of locking flaps 25. The cover members 21 are then swung inwardly toward one another along the respective creased hinges 22 and flaps 25 are then directed downwardly, in side-by-side relation, causing the respective slots 27 to telescope into and straddle the clefts 33 of said divider elements 31.

In this position the respective end flap sections of flap 25 will engage snugly against the adjacent side of the plant sheathing jacket J. Said flaps will also sustain the divider elements 31 against endwise or longitudinal displacement by engaging opposite margins of the slots 27. The recesses 34 of said divider elements exert lateral confining action on the stem S of the plants, as is also clearly illustrated in Fig. 4.

To complete the manipulation of the container, the flanges 18, 19 of the end sections 14 are next swung downwardly or outwardly to impart a flanged box-like outline thereto, and the end section is then swung upwardly and inwardly. This brings the end walls 15 against the adjacent outer end of the plant jacket J, so as to shift the same inwardly into snug engagement with the divider 31. In doing this, the flanges 17, 18 and 19 become snugly nested frictionally within the adjacent surfaces of the bottom 11, side members 20 and top members 21, and the shaped slot 30 in said end wall slides over the pair of locking tongues 29, in the fashion illustrated in Figs. 1 and 5. This telescoped entry of sections 14 into the container additionally and very strongly braces the container as a whole, especially at its end walls. Moreover, the point of penetrated interengagement of the end wall or panel 15 by the longitudinally extending locking ears 29 of the partition flaps 25 is withdrawn inwardly of the container end, so that said ears are protected against displacement or damage by accidental impact.

If desired, conventional staples or the like may be applied to superposed areas of the top members 21 and flange 19 to hold the parts in place, although the frictional engagement of the flanges in the manner mentioned tends considerably to prevent inadvertent displacement under ordinary handling.

When properly addressed, and with postage applied thereto, the container may be placed in the mail at once for parcel post shipment. Upon arrival at its destination, it is only necessary to remove the staples and withdraw the end sections 14, the thumb recesses 24 affording access to flange 19 for this purpose. The top members 21 are then readily lifted up to expose the contents for removal.

The ventilating openings 23, 28 insure a healthful condition for the plants in shipment. As stated above, it may be desirable to enclose the plant form J in a wrapper prior to placing the same in the container, in order to avoid spilling of loose dirt. However, the container eliminates the need for any further wrapping or confining means and thus preserves the ventilation of the plant. It is rigid and distortion resistant, and by reason of these characteristics is capable of repeated re-use, if desired. However, its construction is so inexpensive that it may also be discarded following one use.

The modified embodiment illustrated in Figs. 7 through 11 differs only slightly from the form which is the subject matter of Figs. 1 through 5, primarily in being designed to accommodate three plants or like articles, instead of two. Due to this fact, it has a slightly different type of divider element associated therewith and is proportioned somewhat differently. Accordingly, like reference characters have been employed to designate like parts in so far as the common features of the two structures are concerned.

Referring to Figs. 7 through 11, it will be noted that the bottom 11 and the end walls 15 are approximately three times the width of the side walls 20 and that one of the cover members, designated 21' to distinguish the same, is of twice the width of the side members. The final appearance of the erected container is illustrated in Fig. 7, as well as in section in Fig. 10, in which the purpose of these differences in proportioning is apparent.

Having reference to Fig. 10 it will be noted that the divider elements employed in this modification, which are designated by the reference numeral 36, are provided at equal intervals with the upwardly opening recesses 37, and with a pair of alternating, vertically opening slots or clefts 38. In addition, a separate, longitudinally extending partition member 39 of sheet stock is employed, this member being slotted at 40 to fit into and straddle the slot 38 of the divider elements 36 in which the flaps 25 are not positioned. The two-width space between bottom 11 and top member 21' is thus equally subdivided into two compartments, which in addition to the compartment beneath cover 21, adapt this form of container for the reception and shipment of three articles. Each of such articles has the stem thereof laterally restrained in a recess 37 of the divider and the jacket or related part longitudinally restrained from endwise movement by the divider element 36 itself. Obviously, this embodiment possesses all of the advantages of the first described form, in addition to its augmented capacity.

I claim:

1. A container of the type described, comprising a blank of relatively stiff material folded to define a bottom, a pair of side walls flexibly conjoined to opposite margins of the bottom, a pair of cover members flexibly conjoined to said side walls, and a pair of flaps on said cover members positionable in parallel, longitudinally extending relation to depend internally of and at least partially subdivide the container interior, a partition element disposable transversely of said interior in interengaged relation to said flaps, and an end section flexibly conjoined to an end of said bottom and disposable normal to the bottom in telescoped relation internally of said container a substantial distance inwardly of the adjacent end of the latter, said end section being apertured to receive the adjacent end of said flaps inwardly of the adjacent container end margin, said end section including laterally projecting tab means and a panel integrally hinging the same to said bottom, said tab means and panel frictionally engaging the inside of the container inwardly of said end margin.

2. A container of the type described, comprising a blank of relatively stiff material folded to define a bottom, a pair of side walls flexibly conjoined to opposite margins of the bottom, a pair of cover members flexibly conjoined to said side walls, and a pair of flaps on said cover members positionable in parallel, longitudinally extending relation to depend internally of and at least partially subdivide the container interior, a partition element separate from said blank disposable transversely of said interior in interengaged relation to said flaps, and an end section flexibly conjoined to an end of said bottom and disposable normal to the bottom in telescoped relation internally of said container a substantial distance inwardly of the adjacent end of the latter, said end section being apertured to receive the adjacent end of said flaps inwardly of the adjacent container end margin, said end section including laterally projecting tab means and a panel integrally hinging the same to said bottom, said tab means and panel frictionally engaging the inside of the container inwardly of said end margin.

WILLIAM R. KOHL.

REFERENCES CITED

The following references are of record in the file of this patent:

UNITED STATES PATENTS

| Number | Name | Date |
| --- | --- | --- |
| 1,039,026 | Carter | Sept. 17, 1912 |
| 1,898,646 | Taylor | Feb. 21, 1933 |
| 2,141,399 | Luhn | Dec. 27, 1938 |
| 2,205,157 | Schrell | June 18, 1940 |
| 2,315,368 | Fairchild | Mar. 30, 1943 |
| 2,336,306 | Shoemaker | Dec. 7, 1943 |
| 2,346,206 | Broderick | Apr. 11, 1944 |
| 2,473,766 | Richey | June 21, 1949 |